(12) United States Patent
Sinha (10) Patent No.: US 12,260,550 B2
(45) Date of Patent: Mar. 25, 2025

(54) AUTONOMOUS MEASUREMENT OF THE ZONE OF INHIBITION FOR ANTIBACTERIAL SUTURES

(71) Applicant: Ethicon, Inc., Somerville, NJ (US)

(72) Inventor: Deepika Sinha, Somerville, NJ (US)

(73) Assignee: Ethicon, Inc., Raritan, NJ (US)

(*) Notice: Subject to any disclaimer, the term of this patent is extended or adjusted under 35 U.S.C. 154(b) by 418 days.

(21) Appl. No.: 17/686,930

(22) Filed: Mar. 4, 2022

(65) Prior Publication Data
US 2023/0281802 A1 Sep. 7, 2023

(51) Int. Cl.
| | |
|---|---|
| G06T 7/70 | (2017.01) |
| G06T 5/70 | (2024.01) |
| G06T 7/00 | (2017.01) |
| G06V 10/44 | (2022.01) |
| G06V 10/764 | (2022.01) |

(52) U.S. Cl.
CPC .............. *G06T 7/0012* (2013.01); *G06T 5/70* (2024.01); *G06T 7/70* (2017.01); *G06V 10/44* (2022.01); *G06V 10/764* (2022.01); *G06T 2207/30024* (2013.01)

(58) Field of Classification Search
CPC ......... G06T 7/0012; G06T 2207/30024; G06T 7/70; G06T 2207/20112; G06T 5/70; G06T 2207/20084; G06V 10/44; G06V 10/454; G06V 10/764; G06V 10/25; G06V 10/70; G06V 10/82; G06N 3/02; G06N 3/0464; G06N 3/0455; G06N 20/00
See application file for complete search history.

(56) References Cited

U.S. PATENT DOCUMENTS

| | | | |
|---|---|---|---|
| 10,870,876 B2 * | 12/2020 | Drazek | G01N 33/521 |
| 2022/0246307 A1 * | 8/2022 | Nakamura | G16H 30/20 |
| 2023/0151403 A1 * | 5/2023 | Slotsbo | C12M 41/36 |
| | | | 435/32 |

* cited by examiner

*Primary Examiner* — Sumati Lefkowitz
*Assistant Examiner* — Michael Adam Shariff
(74) *Attorney, Agent, or Firm* — Amir Bishara

(57) ABSTRACT

An image of a zone of inhibition (ZOI) plate is received. The image is processed to detect sutures within the image of the ZOI plate using computer vision, detect a contour of a ZOI within the image of the ZOI plate using computer vision, generate an overlay based on smoothening the contour of the ZOI and perform one or measurements on the image of the ZOI plate, wherein each of the one or more measurements comprises a distance between the sutures and the overlay.

21 Claims, 8 Drawing Sheets

Example 510

Example 550

AUTONOMOUS MEASUREMENT OF THE ZONE OF INHIBITION FOR ANTIBACTERIAL SUTURES

BACKGROUND

A zone of inhibition (ZOI) test may be used to assess the efficacy of antibacterial sutures. To provide an example, the antibacterial sutures may be placed in a petri dish with a bacterial or fungal strain of interest that may cause a surgical site infection (SSI). A clear area (e.g., a ZOI) may develop around the antibacterial sutures if the antibacterial sutures inhibit the growth of the bacterial or fungal strain of interest.

Figure 1:
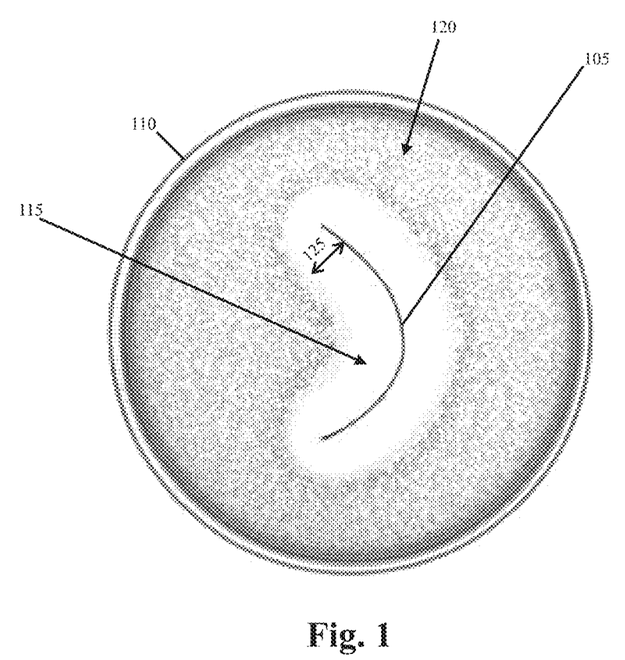
FIG. 1 shows an example of an image taken of a zone of inhibition (ZOI) test sample.

An image may be taken of a petri dish to measure the antibacterial activity. FIG. 1 shows an example of an image taken of a ZOI test sample. The image shows antibacterial sutures 105, a petri dish 110, a ZOI 115 and a bacterial lawn 120. Measurements may be performed on the image to determine a distance between the sutures and the bacterial or fungal strain of interest. In FIG. 1, an example segment 125 is shown between the sutures 105 and the bacterial lawn 120 to illustrate the type of measurements that may be performed on the image of the ZOI test sample.

To ensure accurate and reliable results, the performance of the measurements may implicate various standards and/or protocols. For example, a measurement may not be considered reliable if the size of the image has been modified to perform the measurement on the ZOI test sample. Therefore, in accordance with good laboratory practice (GLP) protocols, it may not be permissible to alter the size of the image and/or modify other image parameters to perform measurements on the image of the ZOI test sample.

Computer vision may be used to perform the measurements on the image of the ZOI test sample. However, it has been identified that conventional computer vision techniques are unable to comply with the type of restrictions that may be imposed on the performance of the measurements and consistently produce accurate results. Accordingly, there is a need for computer vision techniques that enable accurate measurements to be performed on an image of a ZOI test sample without altering the size of the image and/or modifying certain types of image parameters.

SUMMARY

Some exemplary embodiments are related to a method for receiving an image of a zone of inhibition (ZOI) plate, detecting sutures within the image of the ZOI plate using computer vision, detecting a contour of a ZOI within the image of the ZOI plate using computer vision, generating an overlay based on smoothening the contour of the ZOI and performing one or measurements on the image of the ZOI plate, wherein each of the one or more measurements comprises a distance between the sutures and the overlay.

Other exemplary embodiments are related to a system having a storage function configured to receive and store an image of a zone of inhibition (ZOI) plate and an image processing function configured to receive the image of the zone of inhibition (ZOI) plate, detect sutures within the image of the ZOI plate using computer vision, detect a contour of a ZOI within the image of the ZOI plate using computer vision, generate an overlay based on smoothening the contour of the ZOI and perform one or measurements on the image of the ZOI plate, wherein each of the one or more measurements comprises a distance between the sutures and the overlay.

Still further exemplary embodiments are related to one or more processors configured to perform operations. The operations include receiving an image of a zone of inhibition (ZOI) plate, detecting sutures within the image of the ZOI plate using computer vision, detecting a contour of a ZOI within the image of the ZOI plate using computer vision, generating an overlay based on smoothening the contour of the ZOI and performing one or measurements on the image of the ZOI plate, wherein each of the one or more measurements comprises a distance between the sutures and the overlay.

DETAILED DESCRIPTION

The exemplary embodiments may be further understood with reference to the following description and the related appended drawings, wherein like elements are provided with the same reference numerals. The exemplary embodiments relate to performing measurements on an image of a zone of inhibition (ZOI) test sample.

The exemplary embodiments are described with regard to a ZOI test performed to assess the in vitro efficacy of antibacterial sutures against a bacterial strain of interest that may cause a surgical site infection (SSI). To provide an example, the antibacterial sutures may be treated with a substance such as an antimicrobial agent and then placed inside a petri dish with a bacterial or fungal strain of interest. After an incubation period, a clear area may develop around the antibacterial sutures if the antibacterial sutures inhibit the growth of the bacterial or fungal strain of interest. The clear area may be referred to as a ZOI and the size of the ZOI may be indicative of the strength of the treated sutures.

The above example is not intended to limit the exemplary embodiments in any way. Those skilled in the art will understand the types of procedures that may be encompassed by the term "ZOI test." Further, the manner in which the ZOI test is performed is beyond the scope of the exemplary embodiments. Instead, the exemplary embodiments introduce techniques for performing measurements on an image taken of a ZOI test. The ZOI test captured in the image to be measured may be performed using any appropriate type of antimicrobial agent, any appropriate strain of interest (e.g., microbe, fungi, bacteria, etc.) and any appropriate type of equipment (e.g., petri dish, petri plate, agar plate, etc.).

FIG. 1 shows an example of an image taken of a ZOI test sample. The image shows antibacterial sutures 105, a petri dish 110, a ZOI 115 and a bacterial lawn 120. Throughout this description, a ZOI test sample may be referred to as a "ZOI plate." However, reference to the term ZOI plate is merely provided for illustrative purposes. Different entities may refer to similar types of samples by different names.

As indicated above, one or more measurements may be performed on the image of the ZOI plate to assess the efficacy of the antibacterial sutures. The exemplary embodiments introduce techniques for measuring an image of a ZOI plate. To provide a general example, segment 125 of FIG. 1 illustrates a type of measurement that may be performed on the image of the ZOI plate.

Computer vision techniques may be used to measure the image of the ZOI plate. However, the irregular shape of the sutures and the irregular features of the boundary between the ZOI and the strain of interest make it difficult to delineate the boundary of the ZOI. It has been identified that these issues may prevent various conventional computer vision techniques from producing accurate measurements from images of ZOI plates.

The performing of the measurements may implicate various standards and/or protocols. For example, good laboratory practice (GLP) protocols, may prohibit altering the size of the image to be measured. Modifying other parameters of the image to be measured such as, but not limited to, resolution and zoom may be prohibited. In addition, performing certain operations on the image to be measured such as, but not limited to, cropping shrinking and stretching may also be prohibited. Thus, to ensure accurate and reliable results, there may be restrictions placed on how the image of the ZOI plate is processed prior to being measured. There is a need for measurement techniques that are configured to measure an image of a ZOI plate that comply with the relevant testing protocols and consistently produce accurate measurements.

In one aspect, the exemplary embodiments introduce computer vision techniques for measuring an image of a ZOI plate. As will be described in more detail below, the exemplary techniques may include utilizing computer vision to define the shape of the border between the ZOI and the bacterial growth and then measure a distance from the suture to the bacterial growth. The exemplary techniques enable consistent and accurate measurements to be performed on an image of a ZOI plate without modifying the image in a manner that does not comply with the relevant testing protocols.

In another aspect, the exemplary embodiments utilize machine learning mechanisms to improve the manner in which the images of ZOI plates are processed and measured. In addition, the exemplary embodiments introduce an end-to-end platform for ZOI testing that incorporates the exemplary artificial intelligence techniques described herein. However, the exemplary embodiments are not required to be incorporated into an end-to-end platform and may be used independently from one another, in conjunction with currently implemented ZOI testing mechanisms, in conjunction with future implementations of ZOI testing mechanisms or independently from other ZOI testing mechanisms.

Figure 2:
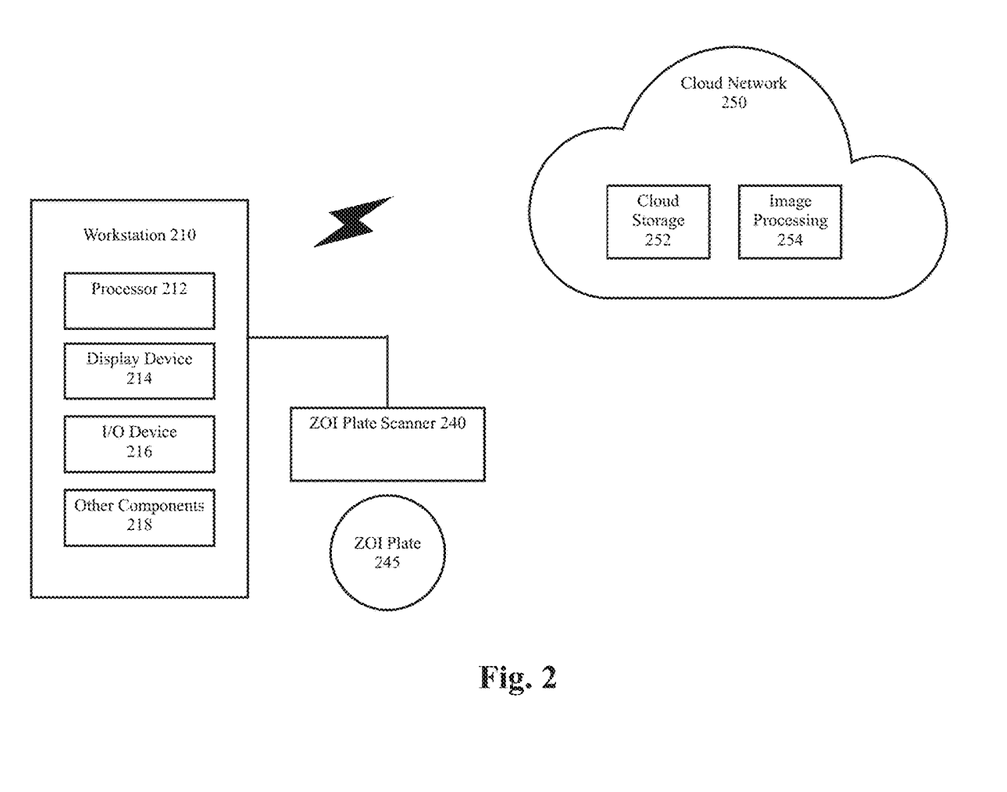
FIG. 2 shows an exemplary system for performing measurements on images of ZOI plates using artificial intelligence according to various exemplary embodiments.

FIG. 2 shows an exemplary system 200 for performing measurements on ZOI plates using artificial intelligence according to various exemplary embodiments. The system 200 includes a workstation 210, a ZOI plate scanner 240, a ZOI plate 245 and a cloud network 250.

Those skilled in the art will understand that the workstation 210 may be any type of electronic component that is configured to send and/or receive data, e.g., a desktop computer, a laptop computer, a smartphone, a table computer, etc. Accordingly, the workstation 210 may represent any suitable electronic device. It may also be understood that an actual system may include any number of workstations being used by any number of users. Thus, the example of a single workstation 210 is merely provided for illustrative purposes.

In this example, the ZOI plate scanner 240 may be a separate electronic device communicatively coupled to the workstation 210 via a wired or wireless interface. However, in an actual system, the ZOI plate scanner 240 and the workstation 210 may be integrated together as a single device.

The ZOI plate scanner 240 may capture images of the ZOI plate 245 using components such as, but not limited to, sensors, cameras, scanners, lenses, etc. The ZOI plate scanner 240 may have a resolution of sufficient megapixels (e.g., 1, 2, 5, 6, 10, etc.) and a zoom of sufficient length (e.g., 10, 20, 35, 50, 60, 69, 75, 100, etc.) to capture the details of bacterial growth. However, any reference to a specific number of megapixels or zoom length is merely provided for illustrative purposes. The exemplary embodiments may utilize images of ZOI plates captured by any appropriate image capturing mechanism.

The workstation 210 may include a processor 212, a display device 214, an input/output (I/O) device 216, and other components 218. The display device 214 may be a hardware component configured to present data to a user. The I/O device 216 may be a hardware component that enables the user to enter inputs. The display device 214 and the I/O device 216 may be separate components or integrated together such as a touchscreen. The other components 218 may include, for example, a power supply, a data acquisition device, a transceiver, and ports to electrically connect the workstation 210 to other devices.

The processor 212 may be configured to execute various types of software for the workstation 210. To provide some examples, the processor 212 may execute software that enables a user to capture images of ZOI plates using the ZOI plate scanner 240 and/or exchange data with the cloud network 250. Reference to a single processor is merely provided for illustrative purposes. The workstation 210 may be equipped with any appropriate number of processors and/or the functionality associated with the software may also be represented as a separate incorporated component of the workstation 210 or may be a modular component coupled to the workstation 210, e.g., an integrated circuit with or without firmware. For example, the integrated circuit may include input circuitry to receive signals and processing circuitry to process the signals and other information.

The workstation 210 may be configured to access one or more networks. In the example of the system 200, the workstation 210 may communicate with the cloud network 250. The cloud network 250 may be hosted on a public or private platform and be equipped with various functions configured to perform a wide variety of different tasks (e.g., data storage, cloud computing, etc.). Those skilled in the art will understand that an actual system may include any number of cloud networks. Thus, the example of a single cloud network 250 is merely provided for illustrative purposes.

The cloud network 250 may be hosted on hardware, software and/or firmware deployed at a single location or distributed over multiple locations. While the exemplary embodiments are described with regard to a cloud implementation, the exemplary embodiments are not limited to this type of arrangement. The exemplary embodiments described herein may be implemented utilizing the cloud network 250, the workstation 210, one or more remote servers and/or any other appropriate arrangements of electronic components.

An image of the ZOI plate 245 may be provided to the cloud network 250 in any appropriate manner. In this example, the cloud network 250 may be equipped with a cloud storage function 252 and an image processing function 254. The cloud storage function 252 may comprise one or more databases configured to store images of ZOI plates, metadata, the results of image processing, measurement data from images of ZOI plates and/or any other appropriate type of data. The image processing function 254 may perform operations such as, but not limited to, identifying a boundary between a ZOI and bacterial growth, image segmentation, contour smoothing, suture classification and measuring a distance between a suture and bacterial growth. Additional details regarding how images of ZOI plates may be processed and measured are provided below.

As mentioned above, in one aspect, the exemplary embodiments introduce computer vision techniques for measuring an image of a ZOI plate. The method 300 provides an example of how these exemplary computer vision techniques may be utilized within the context of the system 200 of FIG. 2. After the description of the method 300, a schematic overview 600 of an end-to-end platform for ZOI testing is described with regard to FIG. 6. The description of the schematic overview 600 will provide examples of how the exemplary computer vision techniques for measuring ZOI plates may be incorporated into the exemplary end-to-end system. In addition, the description of the schematic overview 600 will provide examples of how machine learning mechanisms may be utilized to improve the manner in which the images of ZOI plates are identified, processed and measured.

Figure 3:
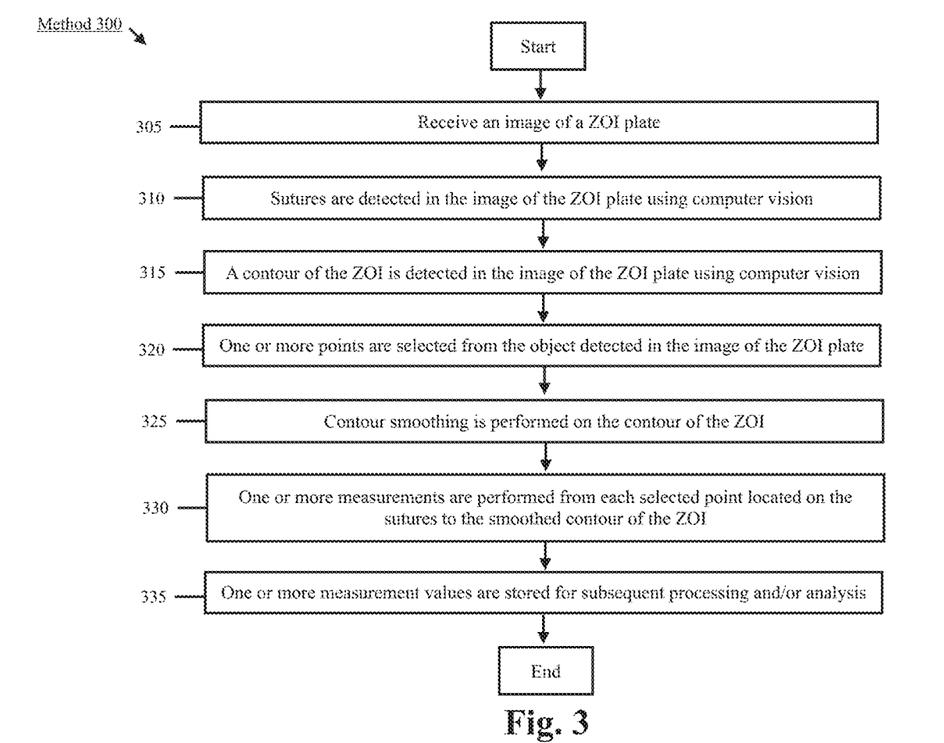
FIG. 3 shows a method for performing measurements on an image of a ZOI plate using computer vision techniques according to various exemplary embodiments according to various exemplary embodiments.

FIG. 3 shows a method 300 for performing measurements on an image of a ZOI plate using computer vision techniques according to various exemplary embodiments. The method 300 will be described with regard to the system 200 of FIG. 2.

In 305, the workstation 210 receives an image of a ZOI plate. For example, the ZOI plate scanner 240 may scan the ZOI plate 245. The image of the ZOI plate may show a petri plate, a suture and a bacterial lawn. The image may be comprised of various image parameters such as, but not limited to, image size, resolution, zoom length, contrast, intensity, saturation, opacity, exposure, grayscale, etc. The image size parameter does not relate to the size of the file. Instead, the image size parameter relates to the physical size of the image and/or resolution of the image measured in pixels. As indicated above, to comply with various standards and/or protocols, at least a subset of the image parameters may not be altered to perform the measurements on the image of the ZOI plate.

In addition to the image data and image parameters, the image file may further comprise metadata and/or any other appropriate type of data. To provide some examples, the ZOI plate scanner 240 or the user may assign a unique identifier to the image, include a timestamp of when the ZOI test was performed and include a timestamp of when the image of the ZOI plate was captured.

In 310, sutures are detected in the image of the ZOI plate using computer vision. Additional details regarding the operations that may be performed to detect the suture object in 310 are provided below after the description of 315.

In this example, the suture detection and the other image processing operations described below may be performed at the cloud network 250. Thus, the workstation 210 may send the image of the ZOI plate to the cloud network 250 prior to 310 of the method 300. However, the exemplary embodiments are not limited to a cloud implementation and may utilize any appropriate arrangement of one or more devices.

In 315, a contour of the ZOI is detected in the image of the ZOI plate using computer vision. Those skilled in the art will understand that the term "contour" may refer to a set of segments and/or points that correspond to the shape of an object that is present in the image. A contour may be identified based on image parameters such as but not limited to, color and intensity. In this example, the contour of the ZOI represents a set of points on the image that align with the boundary between the ZOI and the bacterial lawn. Thus, the reference to the "contour of the ZOI" and the "contour of the bacterial lawn" may be used interchangeably to refer to the same set of points on the image. To provide an example within the context of FIG. 1, the contour may be the boundary between the ZOI 115 and the bacterial lawn 120. Additional details regarding the operations that may be performed to detect the contour of the ZOI in 315 are provided below.

In some embodiments, the suture detection in 310 and the contour detection in 315 may be performed using image segmentation. Those skilled in the art will understand that image segmentation refers to a computer vision technique where an image is partitioned into multiple segments. The individual segments may be analyzed to identify objects of interest contained in the image. This may include determining which pixels of the image correspond to the different objects depicted in the image. For example, it may be determined that a subset of pixels, each identified by their respective pixel coordinates, correspond to the sutures detected within the image of the ZOI plate.

Image segmentation may be performed by one or more models trained to identify the different types of objects that may appear in an image of a ZOI plate. The models may comprise a neural network, a convolutional neural network or any other appropriate type of artificial intelligence mechanism trained to perform image segmentation. The output of the image segmentation process may be one or more segmentation masks identifying the objects in the image (e.g., sutures, ZOI contour, bacterial lawn, etc.). In one example, the suture detection in 310 and the contour detection in 315 may be performed in parallel. In other examples, the segmentation data identifying the sutures may be used to detect the contour of the ZOI (or vice versa).

As mentioned above, the system may prohibit the image of the ZOI plate from being modified in certain ways to comply with various standards and/or protocols (e.g., GLP protocols, etc.). Throughout this description, it is assumed that the size of the image is not modified prior to the performance of the measurements to comply with relevant ZOI testing protocols.

Modifying the size of the image may have a negative impact on the accuracy of the measurements that are to be performed. However, in some embodiments, a subset of image parameters that would not affect the accuracy of measurement to be performed may be modified. For example, image parameters such as, but not limited to, contrast, saturation, opacity, intensity, exposure and gray-scale may be modified. Modifying these types of parameters may enhance the clarity of the image and make the objects within the image (e.g., contour of ZOI, bacterial lawn, sutures, etc.) easier to identify without negatively impacting the accuracy of the measurements to be performed. Thus, the image of the ZOI plate may be enhanced by modifying a subset of the image parameters prior to the suture identification in 310 and/or the contour identification in 315.

In 320, one or more points are selected from the object detected in the image of the ZOI plate. Thus, each of the one or more points may be located within the portion of the image containing the suture detected in 310. As will be described in more detail below, each point may be used as an endpoint for one or more measurements that are to be performed on the image of the ZOI plate. In this example, three points are selected and may be referred to as P1, P2 and P3. However, the exemplary embodiments are not limited to any particular number of points. Thus, the example of three points (P1, P2, P3) is merely provided for illustrative purposes.

The one or more points selected from the image of the ZOI plate in 320 may each correspond to a different pixel. Thus, the one or more points (e.g., P1, P2, P3) may each be associated with a different pair of pixel coordinates (X, Y). Those skilled in the art will understand that an image may be comprised of rows and columns of pixels arranged in a grid. The location of each pixel may be uniquely located by its coordinates. The pixel coordinates may be represented by (X, Y) where (X) represents a column number from columns indexed 0-N and (Y) represents a row number from rows indexed 0-M. For example, the pixel grid may comprise 2800 columns (N=2800) and 2100 rows (M=2100). A pixel with coordinates (1050, 600) would be located at column 1050 and row 600. However, the exemplary embodiments are not limited to the pixel coordinate grid described above. The exemplary embodiments may be utilized with a pixel coordinate grid arranged in any appropriate manner. The exemplary embodiments may also be utilized with other types coordinate systems that are arranged in any appropriate manner.

Figure 4:
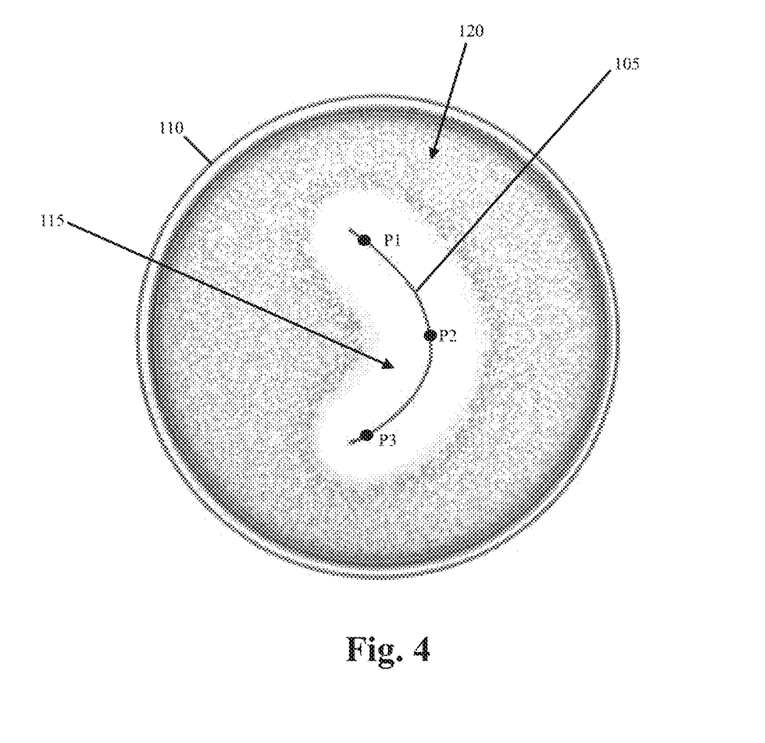
FIG. 4 shows an example of three points (P1, P2, P3) that may be used to perform one or more measurements on the image of the ZOI plate according to various exemplary embodiments.

FIG. 4 shows an example of three points (P1, P2, P3) that may be used to perform one or more measurements on the image of the ZOI plate. FIG. 4 shows the same example image of the ZOI plate from FIG. 1. The points P1, P2 and P3 are emphasized to illustrate an example of approximately where these points may be located along the suture 105 and in relation to one another. However, in an actual operating scenario, each point may correspond to a single pixel coordinate. Thus, if the width of the sutures 105 encompass multiple pixels, only one of the pixels along the width of the sutures may be selected as a point in 320. As will be described in more detail below, each point may then be used to perform one or more measurements on the distance between the sutures and the contour of the ZOI.

P1 is located near a first endpoint of the sutures 105. The location of P1 may be selected based on a predetermined distance from the first endpoint or on any other appropriate basis. Similarly, P3 is located near a second endpoint of the sutures 105. The location of P3 may be selected based on a predetermined distance from the second endpoint or on any other appropriate basis. P2 is located along the sutures 105 in between P1 and P3. The location of P2 may be selected based on a predetermined distance from P1 and P2, a predetermined distance from the first endpoint and the second endpoint, a midpoint of the total length of the sutures or on any other appropriate basis. In some exemplary embodiments, P1 and P3 are located 8 millimeters (mm) from the respective endpoints of the suture and P2 is located at the midpoint of the suture.

Returning to the method 300, in 325, contour smoothening is performed on the contour of the ZOI. The contour smoothening may utilize the output of the contour detection performed in 315. As indicated above, the contour detection may comprise identifying pixels located on the edge of the bacterial lawn that are adjacent to pixels located on the edge of the ZOI. Since the ZOI is a clear area that does not contain bacterial growth, the pixels located within the ZOI depicted in the image will likely have different parameter values (e.g., light intensity, brightness, color, etc.) compared to the pixels located within the bacterial lawn. In some embodiments, the difference in the pixel parameter values between adjacent pixels may indicate where the boundary between the ZOI and the bacterial lawn is located.

However, the transition from ZOI to bacterial lawn may not be a sharp delineation between adjacent pixels. For example, referring to FIG. 1, it can be seen that the transition from ZOI 115 to bacterial lawn 120 may occur over a gradient of pixels. This may result in pixels that are identified as the ZOI contour in the contour detection of 315 not being adjacent pixels, e.g., there may be pixel gaps in the identified contour. As will be described in more detail below, the measurements from the sutures to the ZOI are performed along a substantially perpendicular measurement line with respect to a contour of the suture. Thus, when this perpendicular measurement line is extended from the suture to the contour of the ZOI, it is possible that the perpendicular measurement line passes through one of these gaps which results in an incorrect measurement. To prevent this from occurring, a contour smoothening process is applied to the contour of the ZOI.

The contour smoothening in 325 may comprise generating an overlay of a smoothed contour of the ZOI based, in part, on the set of pixel coordinates identified during the contour detection in 315. However, for any of a variety of different reasons including, but not limited to, the irregular shape of the bacterial lawn, the set of pixel coordinates identified during the contour detection may not form a continuous series of adjacent pixels surrounding the ZOI. As described above, this results in there not being sufficient data to accurately measure the distance between the selected points along the suture (e.g., P1, P2, P3) and the contour of the ZOI. To address this issue, generating the overlay may include selecting a set of pixel coordinates that are to be combined with the set of pixel coordinates identified during contour detection to form a continuous series of adjacent pixels around the ZOI.

The selection of the set of pixel coordinates in the contour smoothening process may be based on a variety of factors. For example, the selection may be based on a distance from the pixels identified in the contour detection. In another example, the selection may be based on parameters of the pixels such as contrast, saturation, opacity, exposure, gray-scale, etc. These different factors may also be combined and various manners including weighting of the parameters. In a still further example, the selection of the set of pixel coordinates in the contour smoothening process may be based on machine learning. For example, multiple prior images of samples and their ZOI contours may be used to train a model that may be used to select the set of pixel coordinates for contour smoothening.

Figure 5:
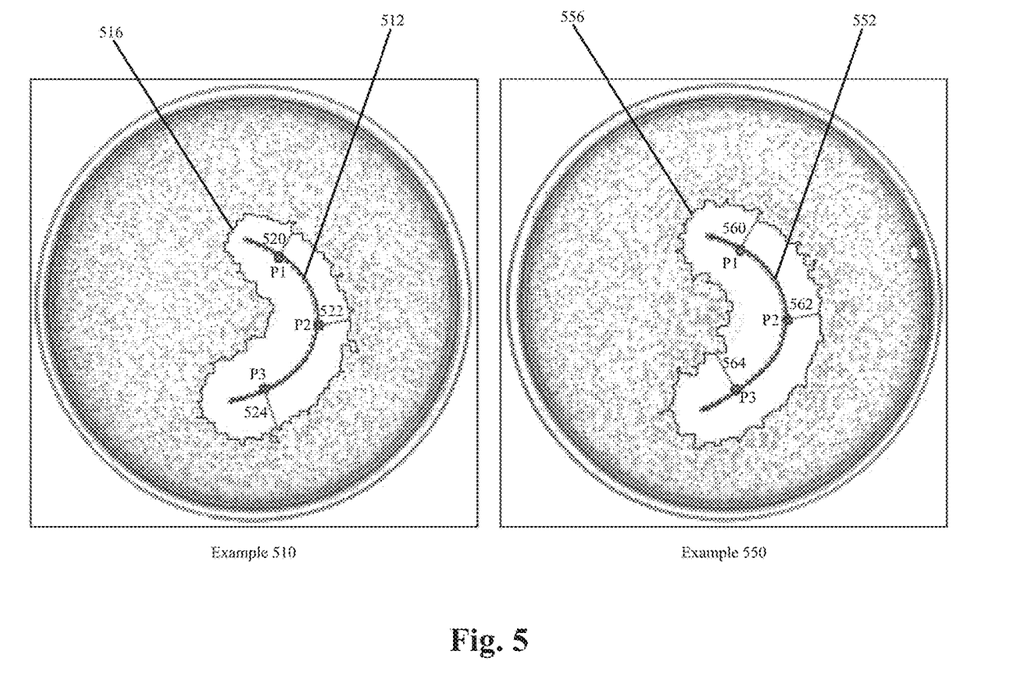
FIG. 5 shows two example images of ZOI plates that have been processed using the exemplary computer vision techniques described herein according to various exemplary embodiments.

FIG. 5 shows two example images 510, 550 of ZOI plates that have been processed using the exemplary computer vision techniques described herein. In example image 510, the sutures 512 have been detected and three points (P1, P2, P3) located on the sutures 512 have been selected to be used to measure a distance between the sutures 512 and the bacterial growth. In addition, the contour of the ZOI has also been detected and an overlay 516 has been generated. As will be described in more detail below, measurements 520-524 may be performed to determine a distance between each point (P1, P2, P3) and the overlay 516.

Similarly, in example image 550, the sutures 552 have been detected and three points (P1, P2, P3) located on the sutures 552 have been selected to be used to measure a distance between the sutures 552 and the bacterial growth. In addition, the contour of the ZOI has also been detected and an overlay 556 has been generated. As will be described in more detail below, measurements 560-564 may be performed to determine a distance between each point (P1, P2, P3) and the overlay 516. However, the example images 510 and 550 are not intended to limit the exemplary embodiments in any way and are merely provided to illustrate an example representation of the overlay that may be generated during the contour smoothening performing in 325.

In 330, one or more measurements are performed from each selected point located on the suture to the smoothed contour of the ZOI. In this example, a shortest perpendicular distance between a selected point (e.g., P1, P2, P3) and the smoothed contour of the ZOI may be measured in millimeters (mm). The distance in mm units may be determined based on converting pixels to mm. Those skilled in the art will understand how this type of conversion may be calculated. In one example, the diameter of the petri dish 110 is a known value and the number of pixels showing the diameter may be used to determine a length value for each pixel. However, other manners of converting a distance to a pixel value may be used. In addition, the exemplary embodiments are not limited to a perpendicular distance or mm units. The exemplary embodiments may perform measurements in any direction relative to a selected point and may utilize any appropriate unit of measurement.

As can be seen in FIG. 5, the perpendicular distance may be based on the contour of the suture. For example, referring to P1 560 in example 550, the perpendicular measurement line is not directly left or right but is based on the contour of the suture resulting in the perpendicular measurement line being upward towards the right as shown in the figure. More specifically, a tangent to the measurement point may be determined based on the contour of the suture. The perpendicular measurement line may be perpendicular to this tangent that includes the measurement point. Thus, the image processing also determines the contour of the suture using techniques such as identifying changes in pixel parameters (e.g., color, intensity, etc.) and determining if these pixels represent the suture and/or the ZOI. The contour of the suture may be determined and subsequently the perpendicular measurement line may be determined based on the contour. The manner of determining the contour of the suture may be similar to the manners described above for determining the contour of the ZOI. In addition, machine learning techniques may also be applied to determining the contour of the suture to select the perpendicular measurement line.

In some embodiments, multiple measurements may be performed from each selected point to the smoothed contour of the ZOI and the shortest distance may be determined. For instance, consider the image of the ZOI plate shown in example 550 of FIG. 5. A perpendicular distance in both the left and right direction may be measured from each of P1, P2 and P3 to the smoothed contour of the ZOI. Thus, six total measurements may be performed. The shortest of the two perpendicular distances may be output as the measurement for its respective point. Thus, in example 550, measurement 560 is shown on the right side of P1 because it is shorter than the perpendicular distance on the left side of P1, measurement 562 is shown on the right side of P2 because it is shorter than the perpendicular distance on the left side of P2 and measurement 564 is shown on the left side of P3 because it is shorter than the perpendicular distance on the right side of P3.

There may be a scenario where it is not possible to measure an exact perpendicular distance (e.g., 90 degrees) between a selected point (e.g., P1, P2, P3) and the smoothed contour of the ZOI. In some embodiments, it may be permissible to measure an approximate perpendicular distance where the angle is within a predetermined threshold value above and/or below 90 degrees, e.g., ±0.3 degrees.

In 335, one or more measurement values are stored for subsequent processing and/or analysis. To provide an example within the context of FIG. 2, the measurements performed on the image of the ZOI plate 245 may be stored by the cloud storage function 252. A user may then access the measurements stored in the cloud via the workstation 210. In some embodiments, instead of or in addition to storing the measurement results in the cloud, the one or more measurement values may be sent to the workstation 210 for display to the user.

Figure 6:
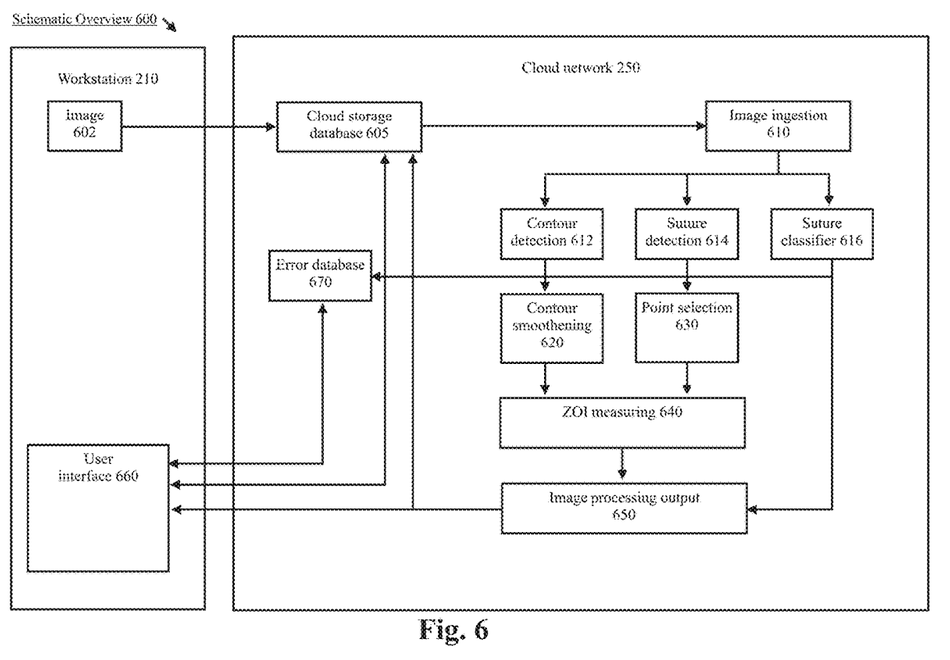
FIG. 6 shows a schematic overview of an end-to-end system for ZOI testing according to various exemplary embodiments.

FIG. 6 shows a schematic overview 600 of an end-to-end system for ZOI testing according to various exemplary embodiments. The schematic overview 600 will be described with regard to the system 200 of FIG. 2 and the method 300 of FIG. 3.

The schematic overview 600 includes the workstation 210 and the cloud network 250. The following description provides examples of how a user may interact with the system and how data may be handled on the network side to facilitate various aspects of ZOI testing. However, as mentioned above, the exemplary embodiments are not limited to a cloud implementation and may utilize any appropriate arrangement of one or more devices.

In this example, an image 602 of a ZOI plate may be provided to the cloud network 250 by the workstation 210. The workstation 210 may also provide metadata and/or any other appropriate type of data corresponding to the image 602. metadata and/or any other appropriate type of data. To provide some examples, the image 602 may be associated with a unique identifier, a timestamp of when the ZOI test was performed and a timestamp of when the image of the ZOI plate was captured.

On the network side, images and corresponding data may be stored in a cloud storage database 605. The cloud storage database 605 may represent one or more databases configured to store various different types of data.

Image ingestion component 610 may be configured to retrieve images from the cloud storage database 605 and send one or more images downstream for further processing. In this example, contour detection 612, suture detection 614 and suture classifier 616 may be performed in parallel.

Contour detection 612 may receive images from image ingestion component 610 and perform contour detection as described above with regard to 315 of the method 300. In some embodiments, an image received by contour detection 612 may be enhanced by modifying a subset of image parameters that would not affect the accuracy of measurement to be performed. For example, image parameters such as, but not limited to, contrast, saturation, opacity, intensity, exposure and grayscale may be modified to make the objects within the image (e.g., contour of ZOI, bacterial lawn sutures, etc.) easier to identify.

Suture detection 614 may receive images from the image ingestion component 610 and perform suture detection as described above with regard to 310 of the method 300. Similarly, in some embodiments, an image received by suture detection 614 may be enhanced by modifying a subset of image parameters that would not affect the accuracy of measurement to be performed.

Figure 7:
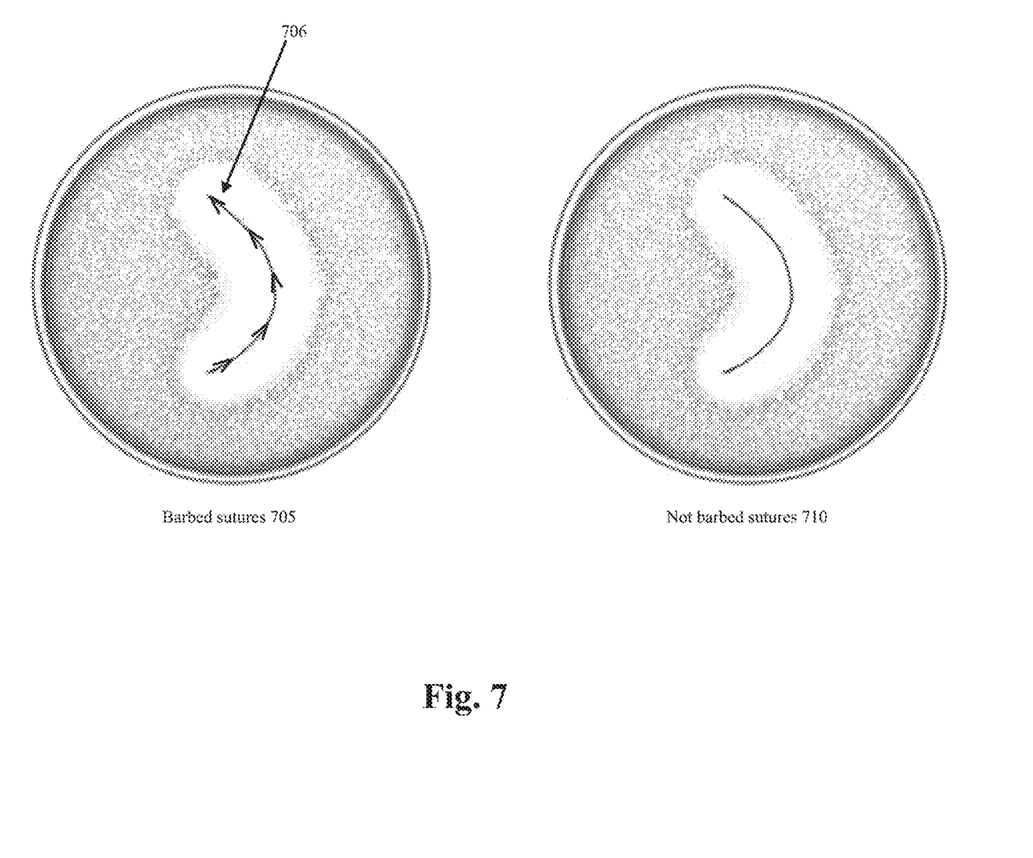
FIG. 7 shows an example of barbed sutures with multiple barbs and an example of not barbed sutures according to various exemplary embodiments.

The suture classifier 616 may identify different types of sutures that may be depicted in the images of the ZOI plates. In this example, there are two different types of sutures i) barbed and ii) not barbed (e.g., unbarbed). FIG. 7 shows an example of barbed sutures 705 with multiple barbs 706 cut into the sutures and an example of not barbed sutures 710. Those skilled in the art will understand that barbed sutures may be knotless sutures. Instead, the barbs 706 may lock them in place.

The suture classifier 616 may comprise one or more models trained to identify different types of sutures contained within an image. The suture classifier 616 may receive an image of a ZOI plate and output a classification of the suture, (e.g., barbed or not barbed) shown in the image of the ZOI plate to the image processing output 650. The one or more models may be deep learning models or any other appropriate type of model to classify whether a suture is barbed.

According to some embodiments, deep learning models may be trained to classify different suture types shown in an image of a ZOI plate. The difference between barbed sutures and unbarbed sutures may be minimal and difficult to distinguish from the image. Thus, it may be beneficial to utilize deep learning models for the suture classifier 616. In some examples, the models may be trained using a transfer learning approach. Three exemplary transfer learning-based models are described in more detail below.

A first exemplary transfer learning-based model may be based on a MobileNet model. Those skilled in the art will understand that MobileNet may refer to a type of convolutional neural network that may be used for image analysis and/or object detection. The MobileNet architecture may comprise 28 layers, the layers may be a combination of convolution, pooling and activation operations. The exemplary transfer learning-based model combines custom neural network layers on top of the MobileNet architecture. Three fully connected custom neural network layers may be hidden in the model. To avoid overfitting, dropouts may be used in between the fully connected dense layers. The transfer learning-based model may use a rectified linear unit as activation function. In addition, an Adams algorithm may be used as an optimizer and a Softmax function may be used as a final activation function.

A second exemplary transfer learning-based model may be based on an Inception V3 model. Those skilled in the art will understand that Inception V3 may refer to a type of convolutional neural network that may be used for image analysis and/or object detection. The inception V3 architecture comprises 48 layers, the layers may be a combination of convolution, pooling and activation operations. The exemplary transfer learning-based model adds one or more custom fully connected dense layers on top of the 48 layers referenced above. Each of the custom fully connected dense layers may be followed by activation and dropout. An Adams algorithm may be used as an optimizer and a Softmax function may be used as a final activation function.

A third exemplary transfer learning-based model may be based on a ResNet deep learning model. Those skilled in the art will understand that ResNet refers to a residual network that can connect the input of the nth layer to the (n+x) layer. The ResNet model may comprise 50 layers, the layers may be a combination of convolution, pooling and activation operations. The exemplary learning-based model adds multiple custom dense layers on top of the 50 layers referenced above. The custom dense layers may be followed by dropout and activation layers may be added. An Adams algorithm may be used as an optimizer and a Softmax function may be used as a final activation function.

The exemplary transfer learning-based models may be trained on a dataset comprising a set of M images of ZOI plates. To increase the size of the available training dataset, the images from the set of M images may be augmented using any appropriate technique. Example augmentation techniques may include, but are not limited to, rotating an image, shearing an image, flipping an image horizontally, shifting the widths of the images and shifting the heights of the images.

While contour detection 612, suture detection 614 and suture classifier 616 are shown as being performed in parallel to one another, the exemplary embodiments are not limited to this configuration. In some embodiments, the suture classifier 616 may receive output from the contour detection 612 and/or the suture detection 614. Thus, the suture classifier 616 may be trained based on images of ZOI plates, output from the contour detection 612 and/or output from suture detection 614. In other embodiments, the output of the contour detection 612 may be provided to the suture detection 614. Thus, contour detection 612 may be trained based on images of ZOI plates and/or output from the suture detection 614. Similarly, the output of the suture detection 614 may be provided to the contour detection 612. Thus, suture detection 614 may be trained based on images of ZOI plates and/or output from the contour detection 612.

Contour smoothening 620 may receive output from contour detection 612 and perform smoothening on the contour of the ZOI as described above with regard to 325 of the method 300. Point selection 630 may receive output from suture detection 614 and select points (e.g., P1, P2, P3) that are to be used to perform one or more measurements as described above with regard 320 of the method 300.

ZOI measuring 640 may receive output from contour smoothening 620 and point selection 630. ZOI measuring 640 may then perform one or more measurements using the points located on the suture (e.g., P1, P2, P3) and the smoothed ZOI contour. In this example, two perpendicular distances are measured from each of P1, P2 and P3. The shortest perpendicular distance from each of P1, P2 and P3 may be selected, and the three selected measurements may be provided as image processing output 650.

Figure 8:
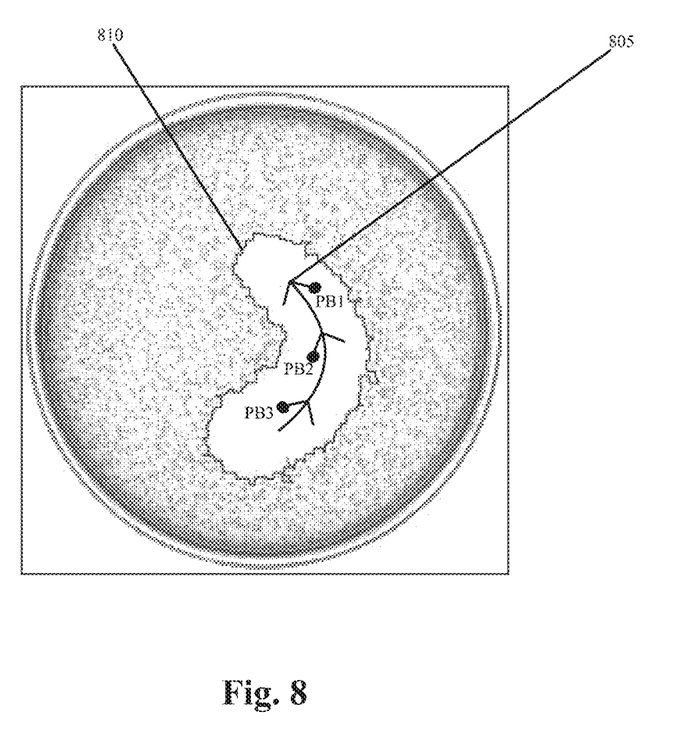
FIG. 8 shows an example of three points (PB1, PB2, PB3) that may be used to perform one or more measurements on an image of a ZOI plate that includes a barbed suture according to various exemplary embodiments.

The examples described above with regard to the method 300 did not reference barbed sutures. In some embodiments, when barbed sutures are identified within the image of the ZOI plate, a point located on a barb cut into the suture may be selected as an endpoint for one or more measurements that are to be performed on the image of the ZOI plate. FIG. 8 shows an example of three points (PB1, PB2, PB3) that may be used to perform one or more measurements on an image of a ZOI plate that includes a barbed suture 805. The points PB1, PB2 and PB3 are emphasized to illustrate an example of approximately where these points may be located along the barbed suture 805 and in relation to one another. A distance between each point (e.g., PB1, PB2, PB3) and the smoothed ZOI contour 810 is then measured.

Returning to the schematic overview 600, the image processing output 650 may comprise an image of the ZOI plate, the overlay of the smoother ZOI contour, the location of the selection points (P1, P2, P2), the measurement data and any other appropriate type data. The image processing output 650 may be provided to the cloud storage database and/or the workstation 210 where it may be displayed to the user via the user interface 660.

The workstation 210 further includes a user interface 660. The user may interact with the workstation 210 and/or the cloud network via the user interface 660. For example, the user may request data stored in the cloud storage database 605 (e.g., previously measured images, measurement results, data corresponding to a particular identifier, etc.). In another example, the user may request that a different set of points be selected from a previously measured image and measurement to be performed using the different set of points. In a further example, the user may indicate that an error has occurred at some point during the image processing.

In addition, the schematic 600 may include an error database 670. The error database 670 may represent one or more databases configured to store images and data that may be associated with an error that occurred during the image processing. The error database 670 and/or the cloud storage database may then be used to train models and improve the performance of image processing components shown in the schematic 600.

In one example, the error database 670 may receive data from contour detection 612 indicating that a ZOI contour cannot be identified within a particular image of a ZOI plate. In another example, the error database 670 may receive data from suture detection 614 indicating that a suture cannot be identified within a particular image of a ZOI plate. In another example, the error database 670 may receive data from suture classifier 616 indicating that a suture cannot be identified within a particular image of a ZOI plate, or a suture has been identified but the type of suture (e.g., barbed, not barbed) cannot be identified. In a further example, the user may indicate via the user interface 660 that an error has occurred at some point during image processing.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described methods may be embodied as software containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An automated method for measuring an efficacy of a suture, comprising:
   receiving within a computing device an image of a zone of inhibition (ZOI) plate including a suture, the zone of inhibition corresponding to an area around the suture within which growth of a biological agent is inhibited;
   detecting by the computing device the suture within the image of the ZOI plate using computer vision using image segmentation;
   detecting by the computing device a contour of a ZOI within the image of the ZOI plate using computer vision employing the image segmentation;
   generating by the computing device an overlay based on smoothening the contour of the ZOI;
   measuring by the computing device a distance between each of a plurality of selected points on the suture and a corresponding point on the overlay adjacent to the selected point; and
   using results of the detecting of the contour of the ZOI to train a machine learning module to enhance the detection of the contours of further ZOI's by the computing device.

2. The method of claim 1, further comprising:
   determining a classification of the suture using one or more trained models, wherein the classification comprises an indication of whether the suture is a barbed suture.

3. The method of claim 1, wherein a location of each of the selected points within the image is selected based on a pixel coordinate grid.

4. The method of claim 3, wherein the pixel coordinate grid is generated based on a machine learning process.

5. The method of claim 1, wherein the distance is a perpendicular distance between the selected point and the corresponding point on the contour of the ZOI.

6. The method of claim 1, wherein detecting the contour of the ZOI within the image of the ZOI plate using computer vision comprises identifying a first set of pixel coordinates.

7. The method of claim 6, wherein smoothening the contour of the ZOI comprises:
   selecting a second set of pixel coordinates within the image that are to be combined with the first set of pixel coordinates to form a continuous series of pixels around the ZOI.

8. The method of claim 6, wherein the selection of the first set of pixel coordinates is based on machine learning.

9. The method of claim 1, wherein the measuring of the distance between the selected points and the contour of the ZOI is based on the results from the trained machine learning module.

10. A system for measuring an efficacy of a suture, comprising:
    a processing arrangement configured to receive and store an image of a zone of inhibition (ZOI) plate; and wherein the processing arrangement is configured to:
  detect a suture within the image of the ZOI plate using computer vision;
  detect a contour of a ZOI within the image of the ZOI plate using computer vision;
  generate an overlay based on smoothening the contour of the ZOI;
  perform one or measurements on the image of the ZOI plate, wherein each of the one or more measurements comprises a distance between each of a plurality of selected points on the suture and a corresponding one of a plurality of related points on the overlay; and
  use results of the detecting of the contour of the ZOI to train a machine learning module to enhance the detection of the contours of further ZOI's by the computing device.

11. The system of claim 10, wherein the processing arrangement is further configured to:
  determine a classification of the suture using one or more trained models, wherein the classification comprises an indication of whether the suture is a barbed suture.

12. The system of claim 10, wherein the processing arrangement selects the selected points based on a pixel coordinate grid.

13. The system of claim 10, wherein the distance is a perpendicular distance between at least one of the selected points and the corresponding one of the related points on the contour of the ZOI.

14. The system of claim 10, wherein the processing arrangement detects the contour of the ZOI within the image of the ZOI plate using computer vision by identifying a first set of pixel coordinates.

15. The system of claim 14, wherein the processing arrangement smoothens the contour of the ZOI by:
  selecting a second set of pixel coordinates within the image that are to be combined with the first set of pixel coordinates to form a continuous series of pixels around the ZOI.

16. One or more processors configured to perform operations for determining an efficacy of a suture, comprising:
  receiving an image of a zone of inhibition (ZOI) plate;
  detecting a suture within the image of the ZOI plate using computer vision;
  detecting a contour of a ZOI within the image of the ZOI plate using computer vision;
  generating an overlay based on smoothening the contour of the ZOI;
  determining a distance between the suture and the overlay;
  using results of the detecting of the contour of the ZOI to train a machine learning module to enhance the detection of the contours of further ZOI's by the computing device.

17. The one or more processors of claim 16, wherein the operations further comprise:
  determining a classification of the suture using one or more trained models, wherein the classification comprises an indication of whether the suture is a barbed suture.

18. The one or more processors of claim 16, wherein determining the distance further comprises:
  selecting a point on the image of the ZOI plate that corresponds to a location on the suture within the image of the ZOI plate; and
  measuring the distance between the point and the overlay.

19. The one or more processors of claim 18, wherein the location of the point within the image is selected based on a pixel coordinate grid and the distance is a distance perpendicular to the suture between the point and the contour of the ZOI.

20. The one or more processors of claim 16, wherein detecting the contour of the ZOI within the image of the ZOI plate using computer vision comprises identifying a first set of pixel coordinates.

21. The one or more processors of claim 20, wherein smoothening the contour of the ZOI comprises:
  selecting a second set of pixel coordinates within the image that are to be combined with the first set of pixel coordinates to form a continuous series of pixels around the ZOI.

* * * * *